Feb. 28, 1967  D. G. GAROFALOW ETAL  3,306,010
ELECTRIC HUMIDIFIER UNIT AND METHOD AND
MEANS OF ILLUMINATION OF THE UNIT
Filed June 5, 1964
2 Sheets-Sheet 1
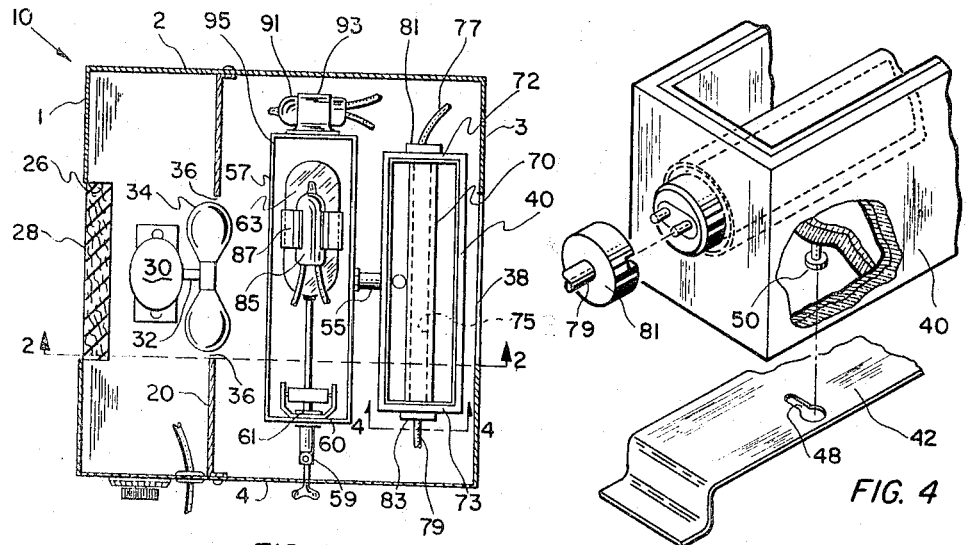
FIG. 1
FIG. 4
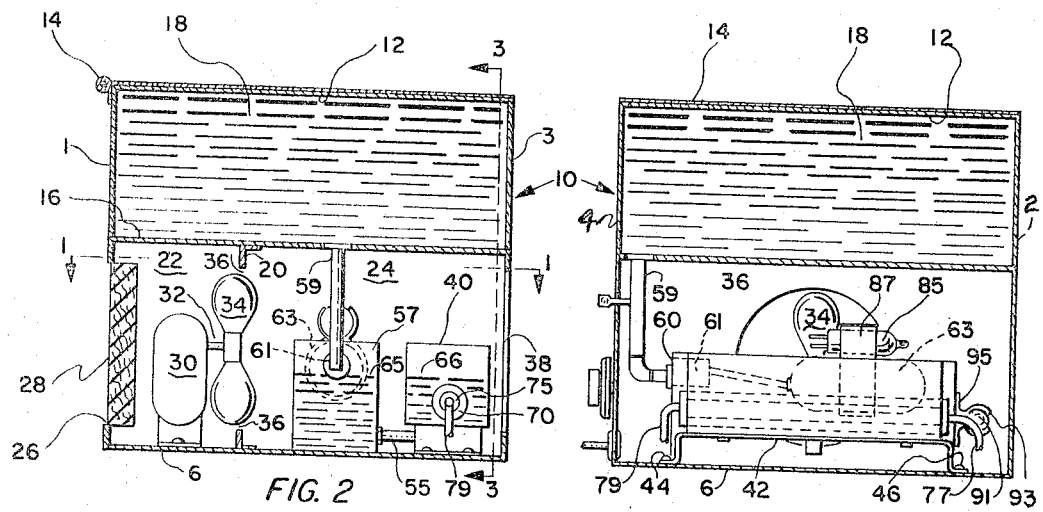
FIG. 2
FIG. 3
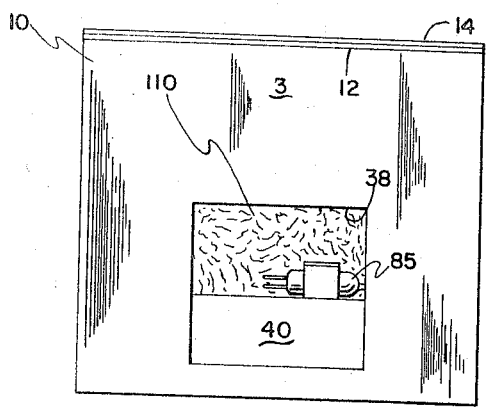
FIG. 5
DONALD G. GAROFALOW
EDWARD P. SCHLOSSER
INVENTORS
BY Richard J Newberg
ATTORNEY Feb. 28, 1967   D. G. GAROFALOW ETAL   3,306,010
ELECTRIC HUMIDIFIER UNIT AND METHOD AND
MEANS OF ILLUMINATION OF THE UNIT
Filed June 5, 1964
2 Sheets-Sheet 2

DONALD G. GAROFALOW
EDWARD P. SCHLOSSER
INVENTORS

BY Richard J. Rowling

ATTORNEY

United States Patent Office 3,306,010
Patented Feb. 28, 1967

3,306,010
ELECTRIC HUMIDIFIER UNIT AND METHOD AND MEANS OF ILLUMINATION OF THE UNIT
Donald G. Garofalow, 552 Spring St., Teaneck, N.J. 07666, and Edward P. Schlosser, 178 Main St., Ridgefield Park, N.J. 07660
Filed June 5, 1964, Ser. No. 373,015
9 Claims. (Cl. 55—263)

This invention relates to an electric humidifier unit and method and means of illumination of the unit and more particularly to a method of generation in an electric humidifier an illuminated water vapor for visual display and to a humidifier unit including electrical means for effecting humidification and an illuminated steam display.

An object of the invention is to provide a novel humidifier unit and method of generating an illuminated water vapor display for humidifying a circulating air stream.

Another object of the invention is to provide a novel, durable, inexpensive and efficient humidifier unit including an infra-red heater lamp cooperating in the unit so as to effect humidification of an air stream circulating through the unit while illuminating the water vapor generated by the lamp and carried by the air stream in leaving the unit in an effective visual display.

Another object of the invention is to provide a novel and economically operating humidifier unit having an open top humidifier pan and an infra-red heater lamp immersed in water carried by the pan so as to vaporize the water therein while serving to illuminate the vaporized water in an effective visual display visable through an outlet opening in the unit for the air and vaporized water.

Another object of the invention is to provide a novel humidifier unit including a fan to circulate air through the unit, together with a novel means for providing effective humidification of the air circulated through the unit by the generation of a water vapor through which the circulated air flows.

Another object of the invention is to provide in such a humidifier unit an infra-red lamp immersed in an open top water container mounted in the unit so that the water may absorb the short infra-red ray radiations from the lamp to effectively vaporize the water in a cloud of steam immediately adjacent an outlet opening from the unit for the circulating air.

Another object of the invention is to so arrange the infra-red ray lamp in relation to an air outlet opening from the humidifier unit as to effectively illuminate the vaporized water in a visual display viewable through the outlet opening.

Another object of the invention is to provide the humidifier unit in a portable compact assemblage and of such simplicity in construction as to be arranged to operate with high efficiency.

Another object of the invention is to provide in such a portable humidifier unit level switching means to protect the unit from operation under a low water cut-off condition or upon an adverse tilting of the unit about the longitudinal or lateral axes of the unit.

The above and other objects and features of the invention will appear more fully hereinafter from a consideration of the following description taken in connection with the accompanying drawings wherein one embodiment of the invention is illustrated by way of example.

Referring to the drawings wherein like reference characters designate like parts:

FIGURE 1 is a sectional top view of a humidifier unit embodying the invention and taken along the lines 1—1 of FIGURE 2, looking in the direction of the arrows;

FIGURE 2 is a sectional view of the unit taken along the lines 2—2 of FIGURE 1, looking in the direction of the arrows;

FIGURE 3 is a sectional view of the unit taken along the lines 3—3 of FIGURE 2, looking in the direction of the arrows;

FIGURE 4 is an enlarged fragmentary perspective view of the humidifier pan and infra-red lamp taken along the lines 4—4 of FIGURE 1 and looking in the direction of the arrows with the electrical connector plug and mounting plate for the pan shown in a disengaged relation;

FIGURE 5 is a front view of the humidifier unit, showing the air outlet opening and humidifier display pan therethrough.

Figure 6:
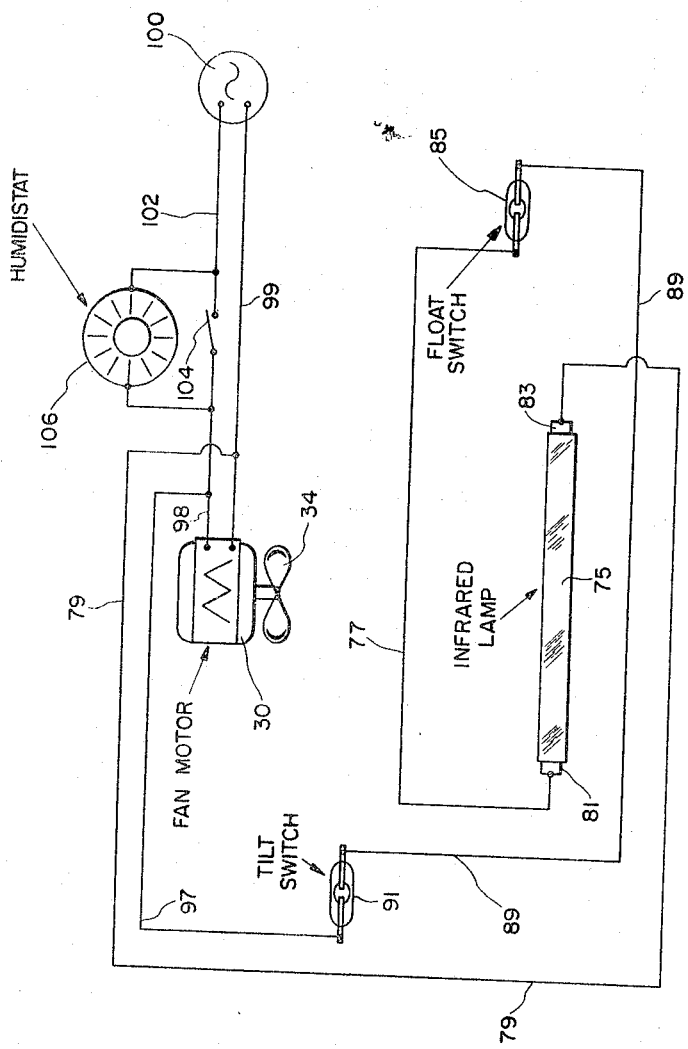
FIGURE 6 is a wiring diagram of the control circuit for the electrical components of the unit of FIGURE 1.

Referring now to the drawings and particularly FIGURES 1, 2, and 3, there is illustrated a housing or casing 10 having side walls 1, 2, 3 and 4 and a bottom wall 6 with a top 12 hinged at 14. The housing 10 is divided by a wall or partition 16 into an upper main water supply chamber 18 and a lower compartment separated by a wall or partition 20 into a chamber 22 and a chamber 24.

There is provided in the wall 1 a rectangular air inlet opening 26 to the chamber 22 from the exterior. In the opening 26 there is mounted an air filter 28 of a conventional type.

Further mounted in the chamber 22 and fastened to the inner surface of the bottom wall 6 is an electric motor 30 of conventional type drivingly connected by a shaft 32 to a fan or blower 34, which is rotatably mounted in a circular opening 36 provided in the wall 20 and opening from the chamber 22 into the chamber 24. There is also provided in the casing 10 a rectangular air outlet opening 38 of equal dimensions to the air inlet opening 26. The air outlet opening 38 is arranged in alignment with the air inlet opening 26 and the circular opening 36 in the wall 20. The air outlet opening 38 leads from chamber 24 to the exterior.

An open top humidifier pan 40 is mounted in the chamber on a leaf spring mounting plate 42 fastened at 44 and 46 to the bottom wall 6 of the casing 10 and having a key hole slot 48, as shown in FIGURE 5, for engaging a locking pin 50 projecting from the bottom of the pan 40 so as to detachably secure the humidifier pan 40 thereon in a position adjacent to and extending across the air outlet opening 38. The humidifier pan 40, as shown in FIGURES 2 and 5, may be seen through the rectangular air outlet opening 38. The humidifier pan 40 is connected through a detachable tube 55, as shown in FIGURES 1 and 2, to an open top auxiliary water pan 57 extending in parallel relation to and immediately behind the pan 40. The pan 57 rest upon the bottom wall 6 and is provided with a water inlet conduit 59 leading from the main supply tank 18 and opening through an end wall 60 of the auxiliary water pan 57. The inlet conduit 59 is controlled by a conventional water inlet valve 61 operated by a conventional float 63. The level of the water 65 in the pan 57 is maintained at a predetermined level by the operation of the valve 61 by the float 63 so as to provide a predetermined water level 66 within the humidifier pan 40, as shown in FIGURE 2, sufficient to cover a heat resistant glass or pyrex tube 70 mounted in the humidifier pan 40.

The tube 70 extends longitudinally in the humidifier pan 40 and is suitably secured in the end walls 72 and 73 of the humidifier pan 40 with opposite ends of the tube 70 extending therethrough. Mounted in the glass tube 70 is a heater lamp 75 which may be of a conventional quartz infra-red lamp type. The heater lamp 75 extends through the tube 70 and has suitable electrical conductors 77 and 79 extending from opposite terminals of the heater lamp 75 for connection in an electrical control circuit, as shown in FIGURE 6. The conductors 77 and 79 may be connected to the opposite terminals of the heater lamp 75 by suitably detachable connectors 81 and 83, as best shown in FIGURE 1.

As shown in the circuit of FIGURE 6, the conductor 77 leads to one terminal of a low water cut-off or level switch 85, which may be of a conventional mercury switch type carried by a bracket 87 affixed to the float 63. The opposite terminal of the cut-off switch 85 is connected by an electrical conductor 89 to one terminal of a level switch 91 which also may be of a conventional mercury switch type carried by a bracket 93 affixed to an end wall 95 of the auxiliary water path 57.

The opposite terminal of the level switch 91 is connected by an electrical conductor 97 to a second electrical conductor 98 leading from one terminal of the electric motor 30 driving the fan 34. The conductor 79 leading from the infra-red ray heater lamp 75 is connected to an electrical conductor 99 leading from an opposite terminal of the electric motor 30 to an output terminal of a suitable source of electrical energy 100 and which for example may be the main alternating current power supply for a home.

The other terminal of the source of electrical energy 100 is connected by an electrical conductor 102 to one terminal of an operator-operative control switch 104. The other terminal of the switch 104 is connected to the conductor 98 and thereby to the electric motor 30 and through the electrical conductors 97, 89 and 77 and the closed mercury switches 91 and 85 to the infra-red lamp 75. Thus operation of the humidifier unit may be controlled at the will of the operator by operation of the control switch 104. Automatic control of the humidifier unit may be effected by a humidistat 106, which may be of a conventional type arranged to close the circuit from conductor 102 to conductors 98 and 97 upon the humidity of the surrounding air decreasing below a predetermined value and opening the circuit upon the humidity increasing above a predetermined value.

As shown in FIGURES 1 and 3, the mercury switch 85 carried by the bracket 87 affixed to the float 63 is arranged to open the electrical circuit to the conductor 77 upon the water level within the auxiliary pan 57 dropping below a predetermined low water level and in which case it would be desirable to cut the infra-red ray heater lamp 75 out of operation. Further, as shown in FIGURES 1, 3 and 5, the mercury switch 85 extends parallel to the lateral axis of the casing 10 so that, upon an undesirable sideward tilting of the casing 10 about its longitudinal axis, the mercury switch 85 is effective to open the electrical circuit to the conductor 77 to terminate the operation of the heater lamp 75 until the casing 10 is returned to a level position.

The level switch 91 carried by the bracket 93 affixed to the end wall 95 of the auxiliary water pan 57 extends parallel to the longitudinal axis of the casing 10 so that, upon an undesirable longitudinal tilting of the casing 10 about its lateral axis, the mercury level switch 91 is effective to open the electrical circuit to the conductor 89 to terminate the operation of the heater lamp 75 until the casing 10 is returned to its level position.

OPERATION

Energization of the tube-like quartz infra-red ray heater lamp 75, effected in normal operation by the closing of the control switch 104, causes the short infra-red rays from the lamp 75 to pass through the glass pyrex tube 70 and to be absorbed by the water surrounding the glass tube 70 in which the tube 70 is immersed so as to effect vaporization of the water.

The vaporized water is emitted as steam vapor from the open top of the humidifier pan 40 which extends across the rectangular opening 38 in the front wall 3 of the humidifier casing 10, as shown by FIGURE 5.

In addition, the infra-red ray heater lamp 95 emits light rays which pass through the glass tube 70 and out the open top of the pan 40 to illuminate the water vapor which tends to accumulate in a cloud-like formation 110 immediately above the open top of the pan 40 and in the space of the rectangular opening 38 above the pan 40. The illuminated water vapor 110 may be viewed through the upper position of the rectangular opening 38, presenting an effective visual display.

Further simultaneously with the energization of the infra-red ray heater lamp 75, the closing of the switch 104 effects energization of the motor 30 to drive the air circulating fan or blower 34. The air blower 34 then draws air through the air inlet opening 26 in the rear wall of the casing 10 and through the air filter 28 into the chamber 22, and in turn forces the air through the opening 36 in the wall 20 into chamber 24. The air then passes through the chamber 24 over the open top auxiliary pan 57 and open top humidifier pan 40, through the accumulated cloud-like illuminated water vapor 110 and out the rectangular outlet opening 38.

The air flowing over the open top of the humidifier pan 40 and out the rectangular air outlet opening 38 causes the cloud-like accumulation of steam or water vapor 110 emitted from the open top of the humidifier pan 40 and illuminated by the light rays from the infra-red ray lamp 75 to appear in a darkened room to flicker like the flames of a fire in a unique visual display while at the same time the steam vapor effects humidification of the air flowing out of the rectangular opening 38 without imparting odors, droplets of water vapor or mineral deposits thereto, as might be the case of a spray type humidifier.

Furthermore the humidifier unit is packaged in a compact assemblage with a self-contained water supply tank 18 so as to be readily adaptable as a portable humidifier unit, which may be conveniently moved about a house to meet the needs therein. The unit may be readily operated from the main supply current for the house by electrically connecting the same to anyone of the usual outlet plugs.

Moreover to assure proper operation of the humidifier unit in a level position and with an adequate water supply on moving the unit from place to place, there has been provided a float operated mercury level switch 85, shown in FIGURES 1 and 6, sensitive (a) to a lateral tilting of the humidifier unit about the longitudinal axis thereof and (b) responsive to a position of the float 63 indicative of a level of the water in the pans 40 and 57 below a predetermined level effective to maintain the tube 70 immersed therein. The mercury switch 85 is uniquely arranged so as to be effective under either of said adverse conditions (a) and (b) to open the energizing circuit for the infra-red ray heater lamp 75 so as to cut the heater lamp 75 out of operation until such adverse conditions have been corrected.

Further to assure against operation of the infra-red ray heater lamp 75 upon an adverse longitudinal tilting of the humidifier unit, there has been provided the mercury level switch 91 shown in FIGURES 1 and 6, sensitive to a longitudinal tilting of the humidifier unit about the lateral axis thereof and so arranged as to be effective under such adverse condition to open the energizing circuit for the infra-red ray heater lamp 75 so as to cut the heater lamp 75 out of operation until such adverse conditions have been corrected.

As shown in FIGURES 1, 2 and 5, the humidifier pan 40 may be readily released from the leaf spring mounting plate 42 by appropriate manipulation of the locking pin 50 in the key hole slot 48 after first detaching the tube 55 from the auxiliary pan 57 so as to permit replacement of the inexpensive pan 40 in which, after long service, a heavy lime or carbonate deposit may form depending upon the mineral content of the water. These deposits may interfere with the efficient vaporization of the water by the infra-red lamp 75 and may thus be avoided by replacement of the pan 40.

Moreover, while the glass tube 70 may be of a clear Pyrex, the tube 70 may also be formed of different colored heat resistant glass so that the color of the illuminated vapor cloud viewable through the rectangular opening 38 may be selected and changed with the humidifier pan 40 to suit the festive occasion or aesthetic sense of the viewer.

In the generation of an illuminated water vapor by the infra-red lamp 75 immersed in the water of the open top humidifier pan 40 and the circulation of a flow of air through the generated steam and across the open top of the pan 40, there may be effected a highly efficient humidification of the outflowing air while at the same time providing a unique visual display in the air blown illuminated water vapor viewable through the rectangular air outlet opening 38.

Although we have shown and described in detail only one embodiment of the invention, it will be readily apparent to those skilled in the art that the same need not be so limited, but that various modifications may be made therein without departing from the spirit thereof or from the scope of the appended claims.

What we claim is:

1. A humidifier unit comprising a housing having an air inlet opening and an air outlet opening therein, means for drawing air through the air inlet opening into the housing and to circulate a flow of air through the housing and out the air outlet opening, a humidifier pan having an open top, means for supplying water to said pan, a heater lamp mounted in said pan, circuit means for supplying electric current for energizing the heater lamp so as to vaporize the water supplied to said pan, the water vapor being emitted through the open top of the pan and illuminated by the heater lamp, said pan extending across a lower portion of said outlet opening and the water vapor tending to accumulate above the pan and at an upper portion of said air outlet opening, the flow of air circulated through the housing passing across the open top of the pan, through the illuminated water vapor and out the outlet opening for effecting humidification of the circulated air, said circuit means includes a first level switch carried by the housing and extending parallel to a lateral axis thereof, a second level switch carried by the housing and extending parallel to a longitudinal axis thereof, said first level switch being arranged to open said circuit means upon a lateral tilting of the housing, said second level switch being arranged to open said circuit means upon a longitudinal tilting of the housing, and said first and second level switches being arranged to close said circuit means upon the tilting of the housing being corrected.

2. A humidifier unit comprising a housing having an air inlet opening and an air outlet opening therein, means for drawing air through the air inlet opening into the housing and to circulate a flow of air through the housing and out the air outlet opening, a humidifier pan having an open top, means for supplying water to said pan, a heater lamp mounted in said pan, circuit means for supplying electric current for energizing the heater lamp so as to vaporize the water supplied to said pan, the water vapor being emitted through the open top of the pan and illuminated by the heater lamp, said pan extending across a lower portion of said outlet opening and the water vapor tending to accumulate above the pan and at an upper portion of said air outlet opening, the flow of air circulated through the housing passing across the open top of the pan, through the illuminated water vapor and out the outlet opening for effecting humidification of the circulated air, said means for supplying water to said humidifier pan including an auxiliary open top pan mounted in the housing and extending parallel to the humidifier pan, means for supplying water from the auxiliary pan to the humidifier pan, float control means for supplying water to the auxiliary pan, a first level switch carried by the float control means and extending parallel to a lateral axis of the housing, said first level switch being arranged to open the circuit means for energizing the heater lamp upon the water in the auxiliary pan being below a predetermined level and upon a lateral tilting of the housing, a second level switch carried by the auxiliary pan and extending parallel to a longitudinal axis of the housing, said second level switch being arranged to open the circuit means upon a longitudinal tilting of the housing, said first and second level switches being aranged to close said circuit means upon said water level and tilting of the housing being corrected 3. A humidifier unit comprising a housing having an air inlet opening an a rectangular air outlet opening therein, means for drawing air through the air inlet opening into the housing so as to circulate a flow of air through the housing and out the rectangular air outlet opening, a humidifier pan having an open top and adapted to receive water therein for vaporizing the same, means for supplying water to said pan, an infra-red lamp extending longitudinally in said pan and adapted to be immersed in the water within said pan, circuit means for supplying electric current for energizing the lamp so as to generate steam from the water, the steam being emitted through the open top of the pan and tending to accumulate immediately above the pan in a cloud-like formation, said pan extending across a lower portion of said rectangular air outlet opening, said infra-red lamp directing light rays through the open top of the pan so as to illuminate said cloud-like formation of steam above the pan, the flow of air circulated through the housing passing across the open top of the pan and through the cloud-like formation of steam to effect humidification of the circulated air and impart a flickering motion to the illuminated cloud-like steam formation in a display viewable through an upper portion of said rectangular air outlet opening.

4. The combination defined by claim 3 in which the means for supplying water to said humidifier pan includes a water supply chamber within said housing, an auxiliary open top pan mounted in the housing and extending parallel to the humidifier pan, means for supplying water from the auxiliary pan to the humidifier pan, and float control means for supplying water to the auxiliary pan from the water supply chamber.

5. A humidifier unit comprising a housing having four side walls, a bottom wall and a top wal, a wall partitioning the housing into an upper water supply chamber and a lower section, another wall partitioning the lower section of the housing into an air inlet chamber and an air outlet chamber, said other wall having a circular opening therethrough connecting the air inlet chamber and the air outlet chamber, a fan rotatably mounted in the circular opening, an electric motor mounted in the air inlet chamber drivingly connected to the fan, one of said side walls having an air inlet opening therethrough, an air filter positioned in said air inlet opening, another of said side walls having a rectangular air outlet opening therethrough, a humidifier pan having an open top and positioned within said air outlet chamber, a glass tubular member positioned longitudinally in said humidifier pan and having opposite open ends extending through end portions of the humidifier pan, an infra-red lamp mounted in said tubular member, an auxiliary pan having an open top and positioned within said air outlet chamber in parallel adjacent relation to said humidifier pan, means for supplying water from the auxiliary pan to the humidifier pan so as to immerse the tubular member therein, floating control means for supplying water to the auxiliary pan from the water supply chamber, a first circuit means for supplying electric current for energizing the electric motor to drive the fan so as to draw air through the air filter into the air inlet chamber and to circulate the air through the circular opening in the other wall into the air outlet chamber and out the rectangular air outlet opening, a second circuit means for supplying electric current for energizing the infra-red lamp to vaporize the water supplied to said humidifier pan, the water vapor being emitted through the open top of the humidifier pan and illuminated by the infra-red lamp, said humidifier pan extending across a lower portion of said rectangular outlet opening and the water vapor tending to accumulate above the humidifier pan and an uppper portion of said rectangular air outlet opening, and the air circulated by the motor driven fan passing across the open top of the humidifier pan, through the illuminated water vapor and out the rectangular outlet opening for effecting humidification of the circulated air.

6. The combination defined by claim 5 including a first level switch carried by the float control means and extending parallel to a lateral axis of the housing, said first level switch being arranged to open the second circuit means upon the water in the auxiliary pan falling below a predetermined level and upon a lateral tilting of the housing, a second level switch carried by an end portion of the auxiliary pan and extending parallel to a longitudinal axis of the housing, said second level switch being arranged to open the second circuit means upon a longitudinal tilting of the housing, and said first and second level switches being arranged to close said second circuit means upon said water level and tilting of the housing being corrected.

7. In a humidifier unit of a type including a housing having an air inlet opening and an air outlet opening therein, means for circulating air through the housing from the air inlet opening and out the air outlet opening, humidifier pan having an open top and mounted within said housing, said humidifier pan carrying a supply of water for vaporization, the improvement comprising a glass tubular member positioned longitudinally in said humidifier pan and having opposite open ends extending through end portions of the humidifier pan, said tubular member being immersed in the water supply carried by said humidifier pan, an infra-red lamp positioned in said tubular member, means for effecting energization of said infra-red lamp to vaporize the water, and the water vapor being emitted through the open top of the humidifier pan and illuminated by the infra-red lamp adjacent an upper portion of said air outlet opening.

8. In a humidifier unit of a type including a housing having an air inlet opening therein, means for circulating air through the housing from the air inlet opening and out the air outlet opening, a humidifier pan mounted within said housing for carrying a supply of water of vaporization, electrical heating means to vaporize the water, and electrical circuit means for effecting energization of said heating means, the improvement in which said electrical circuit means includes first and second level switches, said first level switch being carried by the housing and positioned in parallel relation to a lateral axis of the housing, said second second level switch being carried by the housing and positioned in parallel relation to a longitudinal axis of the housing, said first level switch being arranged to open said circuit means upon a lateral tilting of the housing, said second level switch being arranged to open said circuit means upon a lateral tilting of the housing, said second level switch being arranged to open said circuit means upon a longitudinal tilting of the housing, and said first and second level switches being arranged to close said circuit means upon the tilting of the housing being corrected.

9. In a humidifier unit of a type including a housing having an air inlet opening and an air outlet opening therein, means for circulating air through the housing from the air inlet opening and out the air outlet opening, a humidifier pan mounted within said housing, float control means for supplying water to the humidifier pan, electrical heating means to vaporize the water in the humidifier pan, and electrical circuit means for effecting energization of said heating means, the improvement in which said electrical circuit means includes first and second level switches, said first level switch being carried by the float control means and positioned in parallel relation to a lateral axis of the housing, said first level switch being arranged to open the circuit means upon the water in said humidifier pan being below a predetermined level and upon a lateral tilting of the housing, said second level switch being carried by the housing and positioned in parallel relation to a longitudinal axis of the housing, said second level switch being arranged to open the circuit means upon a longitudinal tilting of the housing, and said first and second level switches being arranged to close said circuit means upon said water level and tilting of the housing being corrected.

References Cited by the Examiner

UNITED STATES PATENTS

| | | | |
|---|---|---|---|
| 1,361,028 | 12/1920 | Drake | 219—275 |
| 2,054,292 | 9/1936 | Maddocks | 261—142 |
| 2,124,482 | 7/1938 | Blair | 219—275 X |
| 2,470,806 | 5/1949 | Cueto. | |
| 2,804,870 | 9/1957 | Chelini | 219—362 X |
| 2,993,107 | 7/1961 | Fichtner | 126—113 X |
| 3,178,159 | 4/1965 | Johnson | 219—362 X |

FRANK W. LUTTER, *Primary Examiner.*

R. R. WEAVER, *Assistant Examiner.*